United States Patent [19]

Stapleton

[11] Patent Number: 4,767,041
[45] Date of Patent: Aug. 30, 1988

[54] LUGGAGE CARRIER WITH DETACHABLE SUSPENDED LOAD-BEARING RACK

[75] Inventor: Craig A. Stapleton, Port Huron, Mich.

[73] Assignee: Huron/St. Clair Company, a division of Masco Industries, Inc., Port Huron, Mich.

[21] Appl. No.: 875,960

[22] Filed: Jun. 19, 1986

[51] Int. Cl.⁴ .............................................. B60R 9/04
[52] U.S. Cl. .................................. 224/326; 224/324; 224/309
[58] Field of Search ............... 224/326, 309, 316, 319, 224/325, 314, 330

[56] References Cited

U.S. PATENT DOCUMENTS

| | | |
|---|---|---|
| 1,748,282 | 2/1930 | Ellis . |
| 2,109,571 | 3/1938 | LeBoeuf . |
| 2,645,391 | 7/1953 | Lecanu-Deschamps . |
| 3,221,960 | 12/1965 | Gleason et al. . |
| 3,253,755 | 5/1966 | Bott . |
| 3,261,520 | 7/1966 | Andersson ................... 224/330 X |
| 3,273,768 | 9/1966 | Duer . |
| 3,838,802 | 10/1974 | Grycel, III . |
| 3,951,320 | 4/1976 | Bott . |
| 4,124,155 | 11/1978 | Kowalski . |
| 4,146,198 | 3/1979 | Bott ................................ 224/324 |
| 4,200,249 | 4/1980 | Synstelien et al. .......... 224/253 X |
| 4,225,068 | 9/1980 | Ingram . |
| 4,438,878 | 3/1984 | Heslop . |

FOREIGN PATENT DOCUMENTS

| | | | |
|---|---|---|---|
| 1026286 | 4/1953 | France ............................. 224/325 |
| 1092494 | 4/1955 | France ............................. 224/325 |

*Primary Examiner*—Henry J. Recla
*Assistant Examiner*—Robert M. Petrik
*Attorney, Agent, or Firm*—Edgar A. Zarins; Leon E. Redman; Malcolm L. Sutherland

[57] ABSTRACT

A luggage rack mountable to the top or back hood of an automobile for transporting luggage. The rack includes a substantially rectangular frame which is secured to the vehicle roof but elevated therefrom by corner stanchions. The cross-members of the frame are provided with slots positioned generally at their outboard ends. The slots are adapted to receive spring clips attached to a load bearing rack that is suspended below the frame in close proximity to the rooftop of the vehicle when connected to the frame. The rack includes a series of parallel load bearing members and upwardly extending support arms. The spring clips are secured to the upper end of the support arms. The suspended rack is fixed in place by the interlocking action of the spring clips within the corresponding frame slots.

20 Claims, 1 Drawing Sheet

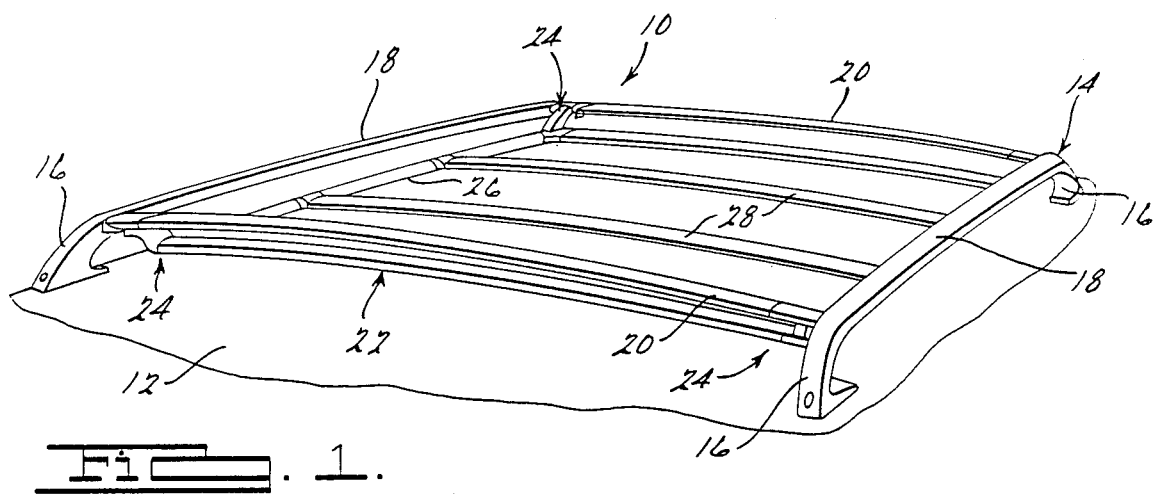
Fig. 1.
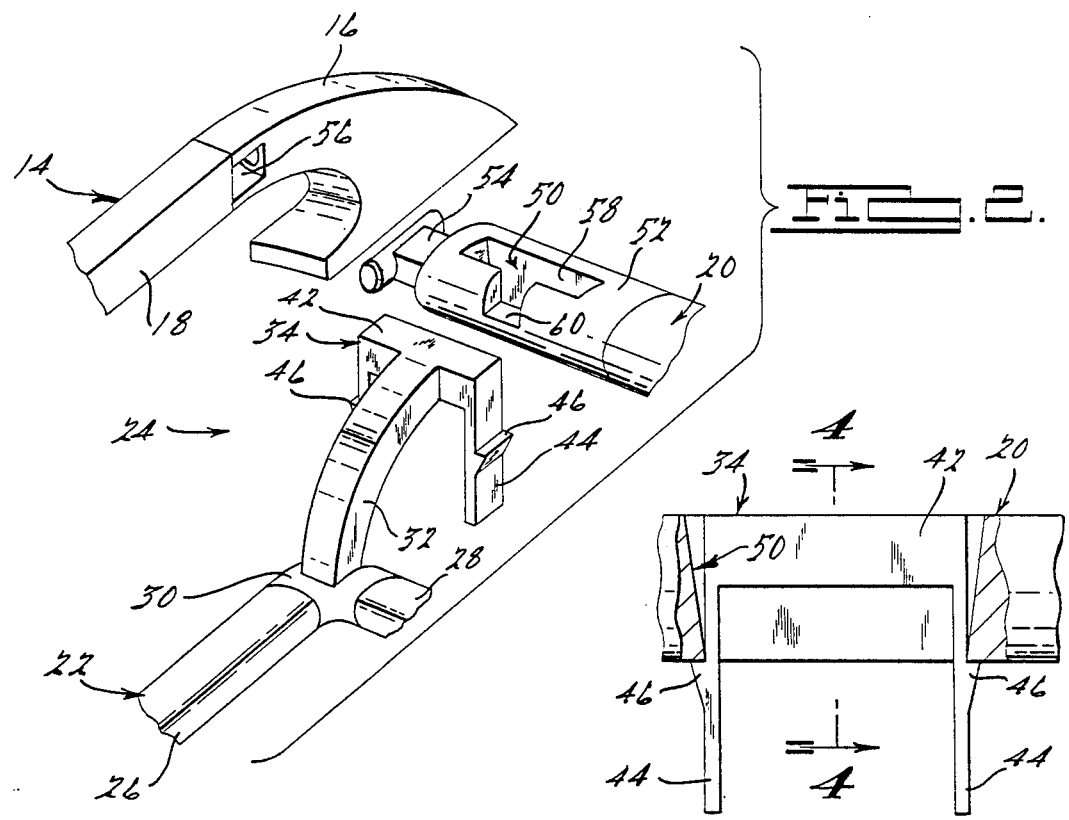
Fig. 2.
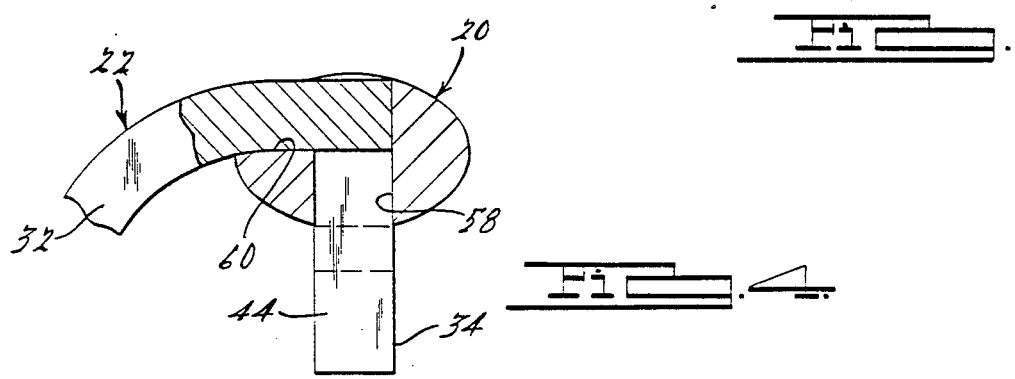
Fig. 3.
Fig. 4.

LUGGAGE CARRIER WITH DETACHABLE SUSPENDED LOAD-BEARING RACK

BACKGROUND OF THE INVENTION

I. Field of the Invention

This invention relates to vehicle mounted luggage carriers and, in particular, to a luggage carrier with a detachable load-bearing rack which is suspended above the surface of the vehicle.

II. Description of the Prior Art

Luggage racks mounted to the exterior surface of automotive vehicles have long been utilized to transport luggage exteriorly of the vehicle. The simplest form of luggage carriers comprises a series of parallel slats mounted flush with the top of the vehicle. These slats are designed to provide extra support while preventing damage to the roof top. However, these racks lack means for constraining the baggage which oftentimes resulted in lost luggage as it slid off the rack.

In order to overcome this disadvantage, an elevated frame was added which prevented the baggage from sliding off of the carrier due to changes in momentum. This frame generally extends about the peripheral edge of the slats which form the load-bearing surface and is supported above the vehicle surface by stanchions mounted to the roof top. Although providing support and constraint of a majority of articles, it was found that heavier packages tended to cause the support slats and the roof top to bow under the weight. However, support racks manufactured from heavier materials were impractical because of vehicle weight and aerodynamic constraints. Moreover, the separate assembly and mounting of the peripheral frame and support rack increased production costs.

As a result, elevated racks were developed which did not depend upon the support of the vehicle top but rather were suspended from the peripheral frame. Since these luggage carriers could be assembled prior to mounting, manufacturing and assembly costs were reduced. Moreover, with this construction, heavier packages may cause the cross rails to bow slightly without contacting or causing damage to the surface of the vehicle. In addition, this elevated construction provides improved aerodynamics by allowing air to travel beneath the luggage across the vehicle top. However, these cross rails are generally fixedly secured to the side rails of the frame and, therefore, do not provide for removal of the suspended rack during periods of nonuse.

In an attempt to overcome this disadvantage, suspended baskets were developed which hook onto the rails of the frame. These past known suspended racks employ a substantially wire construction with wire hooks which overlap one of the rails of the frame. In this manner, the load-bearing basket may be simply removed upon disengaging the clips from the peripheral frame. However, because these known devices have a wire construction the overall strength of the luggage carrier is limited.

SUMMARY OF THE PRESENT INVENTION

The present invention overcomes the disadvantages of the prior art by providing a suspended load-bearing rack for a luggage carrier which is readily detachable from the fixed frame.

The luggage carrier according to the present invention includes an elevated frame fixedly secured to the vehicle surface by a plurality of support stanchions and a load-bearing rack detachably secured to the peripheral frame. The load-bearing rack is suspended from the frame and spaced above the vehicle surface. In the preferred embodiment, both the frame and the suspended rack include a plurality of side and cross rails joined to form substantially rectangular configurations with the support stanchions connected to the corners of the frame.

The suspended load-bearing rack is connected to the frame by a plurality of suspension arms which extend upwardly from the corners of the rack. The upper end of the suspension arms includes a spring clip which is received within mating slots formed in the frame. Each of these spring clips includes a pair of depending fingers which extend through the slot and lockingly engage the clip within the slot. Thus, these clips permit detachment of the load-bearing rack from the fixed frame in accordance with the user's requirements. In addition, such a construction simplifies manufacture and assembly of the luggage carrier.

Other objects, features, and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when used in conjunction with the accompanying drawing, in which like reference characters refer to like parts throughout the views and in which:

FIG. 1 is an elevated perspective of a luggage carrier embodying the present invention;

FIG. 2 is an exploded view of a portion of the luggage carrier of the present invention;

FIG. 3 is a partial cross-sectional perspective of the securing means of the present invention; and FIG. 4 is a side cross-sectional perspective taken along line 4—4 of FIG. 3.

DETAILED DESCRIPTION OF A PREFERRED EMBODIMENT OF THE PRESENT INVENTION

Referring first to FIG. 1, a luggage carrier or rack 10 embodying the present invention is thereshown mounted to a vehicle surface 12. The vehicle surface 12 may be either the rooftop of the vehicle or a rear deck. The luggage carrier 10 generally comprises an elevated frame 14 which is supported above the vehicle surface 12 by a plurality of support stanchions 16 which connect the frame 14 to the vehicle. In a preferred embodiment of the present invention, the frame 14 includes a pair of side rails 18 which extend longitudinally between the support stanchions 16 and a pair of end rails 20 which extend transversely between either the side rails 18 or the support stanchions 16. As is shown in FIG. 1, the side rails 18 preferably form an extension of the support stanchions 16. However, it is to be understood that the support stanchions 16, side rails 18, and end rails 20 may be disposed and interconnected in any manner which facilitates connection of load-bearing rack 22 as will be described herein.

Suspended from the elevated frame 14 is the load-bearing rack 22. The load-bearing rack 22 includes a substantially planar load-bearing surface which is disposed between the vehicle surface 12 and the plane formed by the frame 14. In addition, the load-bearing rack 22 includes means 24 for detachably securing the rack 22 to the frame 14 in suspended relationship to the frame 14 and in spacial relationship to the vehicle surface 12. As with conventional racks, the rack 22 of the present invention includes longitudinal side rails 26 and two or more cross rails 28 which are connected to the side rails 26.

Referring now to FIGS. 2-4, the side rails 26 and cross rails 28 are joined at the corners of the rack 22 by a corner coupling 30 which forms a component of the securing means 24. Integrally formed with the coupling 30 and extending upwardly therefrom is a suspension arm 32. This suspension arm 32 preferably has a substantially outward curvature so as to facilitate connection of the rack 22 to the frame 14. Integrally formed with the upper end of the suspension arm 32 is a spring clip 34. By integrally forming the spring clip 34 with the suspension arm 32 manufacturing and assembly costs are substantially reduced. In the preferred embodiment, the corner coupling 30, the suspension arm 32, and the spring clip 34 are integrally formed of a non-corrosive and resilient plastic material. However, the securing means 24 can be formed of any suitable material including chrome-plated metals. The spring clip 34 preferably comprises a main body 42 and a pair of resiliently biased fingers 44. These fingers 44 depend downwardly from the main body 42 of the clip 34 and include outwardly extending shoulders 46 which retain the clip 34 in position as will be subsequently described.

Formed at the outboard ends of the end rails 20 of the frame 14 are slots 50 which receive the clips 34. In a preferred embodiment, the slots 50 are formed in a separate end piece 52 which is secured to the rail 20. The end piece 52 includes an outwardly extending T-member 54 which is received within a bore 56 formed in the support stanchion 16 and the side rail 18. The T-member 54 is adapted to pivot within the tubular side rail 18 in order to facilitate assembly of the carrier while reducing breakage. As with the securing means 24 of the load-bearing rack 22, the end piece 52 is preferably formed of a plastic material for ease of manufacture. The slot 50 includes a rectangular through-slot 58 and notch 60 which extends inwardly from the slot 58. The slot 50 is configured such that portion 58 receives the spring clip 34 of the securing means 24 while notch 60 receives the upper end of the suspension arm 32 as shown in FIG. 4. As is shown in FIG. 3, the slot 58 includes inwardly tapered side walls which force the fingers 44 of the spring clip 34 inwardly during insertion.

Assembly of the securing means 24 allows detachable connection of the load-bearing rack 22 to the elevated frame 14. The rack 22 is mounted to the frame 14 by placing the clip 34 within the slot 50. The downwardly depending fingers 44 are first placed within the slot 58 and forced downwardly until the shoulders 46 extend through the slot and beneath the rail 20. Because of the resilient bias of the fingers 44, once the shoulders 46 exit the bottom of the through-slot 58 the shoulders will be biased outwardly to secure the clip 34. In this position, the top of the clip 34 aligns with the top of the cross rail 20 in order to minimize wind resistance. Moreover, the suspension arm 32 is received within the notch 60 such that flush alignment between the rail 20 and the securing means 24 is attained. In order to remove the rack 22 from the frame 14, the fingers 44 of the spring clip 34 are simply forced inwardly until the shoulders 46 clear the edges of the slot 50. Thereafter, the entire rack 22 can be lifted from the frame 14 until the clip 34 clears the slot 50.

Thus, the present invention provides a suspended load-bearing rack for a luggage carrier which can be readily detached from the fixed frame of the carrier. In this manner, assembly costs are reduced while the load-bearing rack can be removed as needed by the user.

The foregoing detailed description has been given for clearness of understanding only and no unnecessary limitations should be understood therefrom as some modifications will be obvious to those skilled in the art without departing from the scope and spririt of the appended claims.

I claim:

1. A luggage rack mountable to a vehicle body, said luggage rack comprising:
   a fixed peripheral frame having a plurality of support stanchions fixedly mounting said frame to the vehicle body, said frame being supported in a plane in elevated spacial relationship to the vehicle body by said stanchions;
   a detachable load-bearing rack suspended from said elevated frame between the vehicle body and the plane formed by said elevated frame, said rack supported by said frame in spacial relationship to said frame and the vehicle body, said rack having a plurality of suspension arms extending from said rack and detachably connected to said frame to support said rack in spaced relation above the vehicle body; and
   means for detachably securing said rack in suspended spacial relationship to said frame, said securing means including connecting means disposed at the upper end of said suspension arms and detachably engaging a slot extending through said fixed elevated frame;
   wherein said suspended load-bearing rack is supported by said means for detachably securing said rack, said rack being manually detachable from said fixed elevated frame.

2. The luggage rack as defined in claim 1 wherein said elevated frame is substantially rectangular and includes at least two side rail members and at least two cross rail members.

3. The luggage rack as defined in claim 2 wherein said plurality of stanchions is at least four, one stanchion being connected to each corner of said frame.

4. The luggage rack as defined in claim 3 wherein the ends of said frame side members and the ends of said frame cross members are connected to the upper end of said stanchions.

5. The luggage rack as defined in claim 4 wherein said upper end of said stanchions form the corners of said frame and the lower end of said stanchions are secured to said vehicle body.

6. The luggage rack as defined in claim 5 wherein said stanchions are an integral extension of said frame side members.

7. The luggage rack as defined in claim 2 wherein said load-bearing rack is substantially rectangular and includes at least two side members and at least two end members.

8. The luggage rack as defined in claim 7 wherein said plurality of suspension arms is at least four, one suspension arm being disposed at each corner of said load-bearing rack.

9. The luggage rack as defined in claim 8 wherein the ends of said rack side members and the ends of said rack end members are connected to the lower end of said suspension arms.

10. The luggage rack as defined in claim 9 wherein said lower end of said suspension arms form the corners of said load-bearing rack.

11. The luggage rack as defined in claim 10 wherein said connecting means includes a resiliently biased clip formed at the upper end of said suspension arms, said clip detachably cooperating with a slot formed in said fixed frame.

12. The luggage rack as defined in claim 11 wherein said slots are formed substantially at the ends of said frame cross rail members.

13. The luggage rack as defined in claim 11 wherein said clip comprises a main body portion and a pair of depending fingers, said fingers having outwardly extending shoulder flanges.

14. The luggage rack as defined in claim 13 wherein said shoulder flanges force said fingers inwardly as said clip is placed through said slot and wherein said shoulder flanges extend outside the ends of said slot once said clip is in the connected position thereby detachably locking said clip to said frame.

15. A luggage rack mountable to a vehicle body, said luggage rack comprising:
- an elevated peripheral frame having a plurality of support stanchions fixedly mounting said frame to the vehicle body, said frame being supported by said stanchions in a plane in spacial relationship to the vehicle body;
- a detachable load-bearing rack suspended from said fixed elevated frame between the vehicle body and the plane formed by said elevated frame, said rack supported by said frame in spacial relationship to said frame and the vehicle body, said rack having a plurality of suspension arms extending upwardly from said rack and detachably connected to said frame to support said rack in spaced relation to the vehicle body; and
- means for detachably securing asid rack in suspended spacial relationship to said frame, said securing means comprising a resiliently biased clip disposed at the upper end of said suspension arms and removably received within corresponding longitudinal slots formed in said frame to detachably secure said rack to said frame, said biased clip including a substantially rectangular main body portion and a pair of depending fingers extending from opposite ends of said main body portion, said fingers having outwardly extending shoulder flanges;
- wherein said suspended load-bearing rack may be removed from said fixed elevated frame.

16. The luggage rack as defined in claim 15 wherein said shoulder flanges of said clip engage the underside of said frame when said clip is positioned within said slot.

17. The luggage rack as defined in claim 16 wherein said fingers of said clip are resiliently movable inwardly toward each other to disengage said shoulder flanges and remove said clip from said slot thereby manually detaching said suspended load-bearing rack from said elevated frame.

18. A suspension arm and clip assembly for detachably securing a load-bearing rack of a vehicle luggage carrier in suspended spacial relation to the vehicle surface and an elevated peripheral frame, said frame having a plurality of support stanchions fixedly mounting said frame to the vehicle surface and frame rails extending between said support stanchions, said assembly comprising:
- a suspension arm extending upwardly from said rack; and
- a resiliently biased clip formed at the upper end of said suspension arm, said clip including a substantially rectangular main body having opposite ends, said body connected to said suspension arm substantially at a midpoint of said body, and a pair of depending fingers extending downwardly from said ends of said main body, said fingers having outwardly extending shoulder flanges,
- wherein said resiliently biased clip mates with a longitudinal slot formed in the frame rail of said peripheral frame, the top of said assembly aligning with the top of the frame rail and said shoulder flanges of said clip engaging the underside of the frame rail when said resilient fingers are placed through said slot, thereby removably locking said assembly to the frame.

19. The assembly as defined in claim 18 wherein said fingers of said clip are resiliently movable inward toward each other to disengage said shoulder flanges from the underside of the frame rail and remove said clip from said slot thereby manually detaching the suspended load-bearing rack from the peripheral frame.

20. The assembly as defined in claim 19 wherein said suspension arm has an outward curvature, the frame rail including a notch adjacent said longitudinal slot adapted to receive a portion of said suspension arm.

* * * * *